(12) United States Patent
Kim et al.

(10) Patent No.: US 12,269,476 B2
(45) Date of Patent: Apr. 8, 2025

(54) MOBILE APPARATUS FOR OBSERVING ROAD SURFACE AND METHOD FOR CONTROLLING THE SAME

(71) Applicant: NATIONAL INSTITUTE OF METEOROLOGICAL SCIENCES, Seogwipo-si (KR)

(72) Inventors: Yoo Jun Kim, Gangneung-si (KR); Ji Wan Kim, Gangneung-si (KR); Byung Hwan Lim, Gangneung-si (KR)

(73) Assignee: NATIONAL INSTITUTE OF METEOROLOGICAL SCIENCES, Seogwipo-si (KR)

( * ) Notice: Subject to any disclaimer, the term of this patent is extended or adjusted under 35 U.S.C. 154(b) by 0 days.

(21) Appl. No.: 18/678,106

(22) Filed: May 30, 2024

(65) Prior Publication Data

US 2024/0425055 A1    Dec. 26, 2024

(30) Foreign Application Priority Data

Jun. 23, 2023    (KR) .......................... 10-2023-0080992

(51) Int. Cl.
  *G06V 20/56*      (2022.01)
  *B60W 40/06*     (2012.01)
(52) U.S. Cl.
  CPC ........... *B60W 40/06* (2013.01); *G06V 20/588* (2022.01); *B60W 2555/20* (2020.02)
(58) Field of Classification Search
  CPC .. B60W 40/06; B60W 2555/20; B60W 50/14; B60W 2420/403; B60W 10/20; B60W 2050/146; B60W 2420/408; B60W 2554/20; B60W 2556/45; B60W 60/001; B60W 2540/18; B60W 2552/53; B60W 30/06; B60W 30/12; B60W 30/18036; B60W 40/02; B60W 40/068;
  (Continued)

(56) References Cited

U.S. PATENT DOCUMENTS

| 6,254,259 B1 * | 7/2001 | Kobayashi | B60Q 1/085 |
| | | | 340/459 |
| 2008/0228400 A1 * | 9/2008 | Wheeler | G08G 1/02 |
| | | | 701/301 |

(Continued)

FOREIGN PATENT DOCUMENTS

| KR | 10-0779466 B1 | 11/2007 |
| KR | 10-2012-0132849 A | 12/2012 |

(Continued)

*Primary Examiner* — Nimesh Patel
(74) *Attorney, Agent, or Firm* — Bridgeway IP Law Group, PLLC; Jihun Kim

(57) ABSTRACT

Described are a mobile apparatus for observing a road surface and a method for controlling the same, and the mobile apparatus for observing a road surface may include: a collector acquiring road surface sensing information including image information and road surface state information corresponding to a road surface; a determiner determining whether there is a paint on the road surface based on the image information; and a corrector generating final road surface state information by selectively performing correction of the road surface state information based on a result of determining whether there is the paint on the road surface.

13 Claims, 7 Drawing Sheets

(58) Field of Classification Search
CPC ............. B60W 50/085; B60W 50/087; B60W 30/0956; B60W 2554/00; B60W 2520/06; B60W 2720/24; B60W 30/095; B60W 30/0953; B60W 50/0097; B60W 40/105; B60W 40/114; B60W 30/14; B60W 30/18163; B60W 50/0098; B60W 10/18; B60W 2050/143; B60W 2556/40; B60W 30/08; B60W 30/09; B60W 30/143; B60W 40/04; B60W 2050/0095; B60W 50/00; B60W 2554/4045; B60W 2554/406; B60W 30/10; B60W 30/16; B60W 30/165; B60W 60/00; B60W 60/00274; B60W 2520/16; B60W 2552/05; B60W 2552/35; B60W 2050/0075; B60W 60/0059; G06V 20/588; G06V 10/764; G06V 10/82; G06V 10/454; G06V 20/58; G06V 10/98; G06V 20/10; G06V 20/56; G06V 10/70; G06V 20/20; G06V 20/17; G06V 10/141; G06V 10/225; G06V 10/255; G06V 20/584; G06V 40/103; G06V 10/147; G06V 10/143; G06V 10/955; G06V 10/145; G05D 1/0246; G05D 1/0221; G05D 1/0234; G05D 1/0242; G05D 1/0255; G05D 1/021; G05D 1/0251; G05D 1/0257; G05D 1/0287; G05D 1/249; G05D 1/0027; G05D 1/0253; G05D 1/2437; G05D 2101/10; G05D 2101/15; G05D 2109/10; G05D 2109/16; G05D 2109/254; G06T 2207/30252; G06T 2207/10016; G06T 7/70; G06T 2207/10048; G06T 2207/30256; G06T 2207/10024; G06T 5/50; G06T 2207/20081; G06T 2207/20084; G06T 2207/30261; G06T 2207/10012; G06T 17/00; G06T 1/00; G06T 2207/10021; G06T 2207/30248; G06T 7/174; G06T 2207/10004; G06T 7/74; G06T 3/18; G06T 17/05; G06T 2207/10028; G06T 2207/30204; G06T 7/80; G06T 2207/10044; G06T 1/20; G06T 19/003; G06N 20/00; G06N 5/04; G06N 3/08; G06N 3/045; G06N 3/004; G06N 3/04; G06N 3/047; B64U 2101/30; B64U 10/13; B64U 2201/20; B64U 2201/10; B64U 20/87; B64U 2101/00; B64U 2101/16; B64U 2101/28; B64U 80/86; B60R 11/04; B60R 9/06; B60R 2300/301; B60R 1/24; B60R 1/27; B60R 2001/1223; B60R 2011/004; B60R 2001/1253; B60R 2300/105; B60R 2300/302; B60R 2300/305; B60R 2300/8086; B60R 2300/8093; B60R 2300/8033; B60R 1/30; B60R 1/04; B60R 1/06; B60R 21/0134; B60R 21/01538; B60R 2300/106; B60R 2300/108; B60R 2300/804; B60R 2300/8053; B60T 2210/12; B60T 8/172; B60T 8/1725; B60T 8/1701; B60T 8/17558; B60T 2201/08; B60T 2201/089; B60G 17/019; B60G 2400/82; B25J 13/08; B25J 19/023; B25J 19/02; B25J 13/006; B25J 9/0084; B25J 9/1679; B25J 5/00; B60Q 9/008; B60Q 1/1423; B60Q 2400/50; B60Q 1/085; B60Q 1/18; B60Q 2300/32; B60Q 2300/41; B60Q 2300/42; B60Q 1/143; B60Q 2300/314; B60Q 2300/312

See application file for complete search history.

(56) References Cited

U.S. PATENT DOCUMENTS

| | | | |
|---|---|---|---|
| 2019/0018989 A1* | 1/2019 | Kovarik | G05D 1/0261 |
| 2020/0202560 A1* | 6/2020 | Viswanathan | G06F 18/2413 |
| 2022/0051563 A1* | 2/2022 | Pearl | G08G 1/0141 |

FOREIGN PATENT DOCUMENTS

| | | |
|---|---|---|
| KR | 10-1835544 B1 | 3/2018 |
| KR | 10-2143641 B1 | 8/2020 |

* cited by examiner

MOBILE APPARATUS FOR OBSERVING ROAD SURFACE AND METHOD FOR CONTROLLING THE SAME

CROSS-REFERENCE TO RELATED APPLICATIONS

This application claims the priority of Korean Patent Application No. 10-2023-0080992 filed on Jun. 23, 2023, in the Korean Intellectual Property Office, the disclosure of which is incorporated herein by reference.

BACKGROUND

Field

The present disclosure relates to a mobile apparatus for observing a road surface and a method for controlling the same.

Description of the Related Art

A road state sensor can sense a state of a surface of a road (road surface) on roads, highways, or the like. Information on the sensed state of the road surface mainly can include moisture, temperature, and friction force on the road surface, and the state information of the road surface can be importantly used to support drivers using the road to perform safe driving.

However, when the road state sensor senses a dried state of a road to which a paint is applied, there is a problem in that the sensed road surface state information includes a high ratio of error value. Since the error value can cause a great risk to drivers using the road, a problem of decreasing reliability of the road surface state information for a paint section of the dried road should be urgently solved, but there is no related art for solving the problem.

A technology which becomes a background of the present disclosure is disclosed in Korean Patent Registration No. 10-0779466.

SUMMARY

The present disclosure is contrived to solve the problem in the related art described above, and an object to be achieved by the present disclosure is to provide a mobile apparatus for observing a road surface and a method for controlling the same which can solve, when a road surface state sensor senses a dried state of a road to which a paint is applied, a problem in that a high ratio of error value is included in the sensed road surface state information.

However, a technical object to be achieved by the exemplary embodiment of the present disclosure is not limited to the technical objects as described above and there may be other technical objects.

According to an aspect of the present disclosure, there is provided a mobile apparatus for observing a road surface which may include: a collector acquiring road surface sensing information including image information and road surface state information corresponding to a road surface; a determiner determining whether there is a paint on the road surface based on the image information; and a corrector generating final road surface state information by selectively performing correction of the road surface state information based on a result of determining whether there is the paint on the road surface.

According to an exemplary embodiment of the present disclosure, the corrector may generate the final road surface state information without performing the correction of the road surface state information when it is determined that the paint is not present on the road surface.

According to an aspect of the present disclosure, the collector may further acquire weather information, and the road surface sensing information may further include road surface temperature information.

According to an aspect of the present disclosure, the determiner may determine whether the road surface temperature information and the weather information satisfy a predetermined condition when it is determined that the paint is present on the road surface.

According to an aspect of the present disclosure, the corrector may generate the final road surface state information by selectively performing the correction of the road surface state information based on a result of determining whether the road surface temperature information and the weather information satisfy the predetermined condition.

According to an aspect of the present disclosure, the determiner may determine a dry degree based on the weather information when it is determined that the road surface temperature information and the weather information do not satisfy the predetermined condition.

According to an aspect of the present disclosure, the corrector may generate the final road surface state information by performing the correction of the road surface state information based on the road surface sensing information when it is determined that a dry degree is equal to or more than a predetermined degree.

According to an aspect of the present disclosure, the corrector may generate the final road surface state information without performing the correction of the road surface state information when it is determined that the dry degree is less than the predetermined degree.

According to an aspect of the present disclosure, the weather information may include precipitation information, and the precipitation information may include precipitation particle type information.

According to an aspect of the present disclosure, the corrector may generate the final road surface state information by selectively performing the correction of the road surface state information based on the precipitation particle type information when it is determined that the road surface temperature information and the weather information satisfy the predetermined condition.

According to an aspect of the present disclosure, the weather information may include temperature information and precipitation information, and the predetermined condition may include temperature information of a predetermined threshold temperature or less, precipitation information of a predetermined threshold precipitation amount or more, and road surface temperature information of a predetermined threshold road surface temperature or less.

According to an aspect of the present disclosure, the mobile apparatus for observing a road surface may include a road surface state sensor and a lighting member, the road surface state sensor may include at least one of a heater member, a blow member, and a wiper member, the collector acquires the road surface state information by using the road surface state sensor, and the mobile apparatus for observing a road surface may further include a controller selectively driving at least one of the heater member, the blow member, and the wiper member based on the weather information, and selectively driving the lighting member based on the image information.

According to an aspect of the present disclosure, the mobile apparatus for observing a road surface may include a base plate with a movement member, the mobile apparatus for observing a road surface may further include a mover moving a location of the base plate from a first location to a second location by using the movement member, and the second location may be location information corresponding to the road surface in which there is the paint.

According to another aspect of the present disclosure, there is provided a method for controlling a mobile apparatus for observing a road surface which may include: acquiring, by a collector, road surface sensing information including image information and road surface state information corresponding to a road surface; determining, by a determiner, whether there is a paint on the road surface based on the image information; and generating, by a corrector, final road surface state information by selectively performing correction of the road surface state information based on a result of determining whether there is the paint on the road surface.

The above-described solving means is only an exemplary and should not be interpreted as the intention to restrict this application. In addition to the exemplary embodiments described above, there may be additional exemplary embodiments in drawings and the detailed description of the present disclosure.

According to the solving means of the present disclosure, a mobile apparatus for observing a road surface and a method for controlling the same are provided to solve, when a road surface state sensor senses a dried state of a road to which a paint is applied, a problem in that a high ratio of error value is included in sensed road surface state information.

However, the effects that can be obtained herein are not limited to the effects described above, and there may be other effects.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
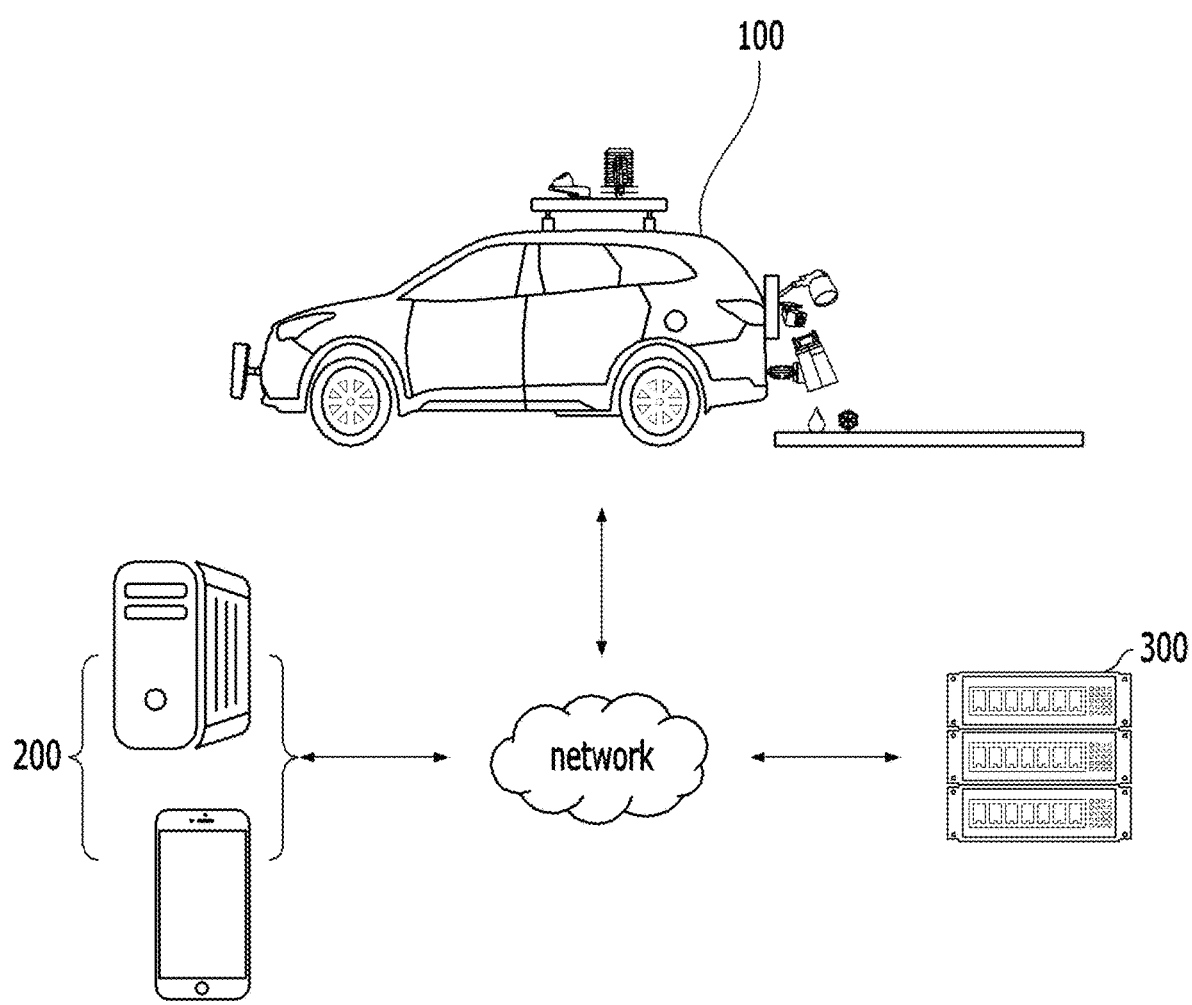
FIG. 1 is a schematic configuration diagram of a mobile road surface observing system according to an exemplary embodiment of the present disclosure.

Hereinafter, exemplary embodiments of the present disclosure will be described in detail so as to be easily implemented by those skilled in the art, with reference to the accompanying drawings. However, the present disclosure may be implemented in various different forms and is not limited to exemplary embodiments described herein. In addition, in the drawings, in order to clearly describe the present disclosure, a part not related to the description is not omitted and like reference numerals designate like elements throughout the specification.

Throughout the specification of the present disclosure, when it is described that a part is "connected" with another part, it means that the certain part may be "directly connected" with another part and the elements "electrically connected" or "indirectly connected" to each other with a third element interposed therebetween as well.

Throughout this specification, it will be understood that when a member is referred to as being "on", "at an upper portion of", "on the top of", "beneath", "at a lower portion of", and "on the bottom of" another member, it can be directly on the other member, or intervening members may also be present.

Throughout this specification, unless explicitly described to the contrary, a case where any part "includes" any component will be understood to imply the inclusion of stated components but not the exclusion of any other component.

FIG. 1 is a schematic configuration diagram of a mobile system for observing a road surface 1 according to an exemplary embodiment of the present disclosure.

Referring to FIG. 1, a mobile road surface observing system 1 (hereinafter, also referred to as 'the system 1') includes a mobile apparatus 100 for observing a road surface (hereinafter, also referred to as 'the apparatus 100'), a user terminal 200, and an external server 300, but is not limited thereto.

According to the system 1, the apparatus 100 may acquire image information corresponding to a road surface of a target road and acquire road surface sensing information including road surface state information of the target road. Further, the apparatus 100 determines whether there is a paint on the road surface of the target road based on the acquired image information, and selectively corrects road surface state information acquired based on a determination result to generate final road surface state information.

According to an exemplary embodiment of the present disclosure, the apparatus 100 may provide, to the user terminal 200, an image information and road surface sensing information acquisition menu, a paint determination menu, and a correction menu. For example, the user terminal 200 downloads and installs an application program provided by the apparatus 100, and the image information and road surface sensing information acquisition menu, the paint determination menu, and the correction menu may be provided through the installed application.

The apparatus 100 may include all types of servers, terminals, or devices which have functions of transmitting and receiving data, contents, and various communication signals to and from the user terminal 200 and the external server 300 through a network and storing and processing data.

The user terminal 200 as a device which is in communication with the apparatus 100 and the external server 300 through a network may be all types of wireless communication devices including, for example, smartphones, smart pads, tablet PCs, wearable devices, and personal communication system (PCS), global system for mobile communication (GSM), personal digital cellular (PDC), personal handyphone system (PHS), personal digital assistant (PDA), international mobile telecommunication (IMT)-2000, code division multiple access (CDMA)-2000, W-code division multiple access (W-CDMA), and wireless broadband Internet (Wibro) terminals, and fixed terminals such as a desktop computer and a smart TV.

An example of a network for information sharing between the apparatus 100, the user terminal 200, and the external server 300 may include a 3rd generation partnership project (3GPP) network, a long term evolution (LTE) network, a 5G network, a world interoperability for microwave access (WIMAX) network, wired/wireless Internet, a local area network (LAN), wireless local area network (LAN), a wide area network (WAN), a personal area network (PAN), a Bluetooth network, a Wi-Fi network, a near field communication (NFC) network, a satellite broadcasting network, an analog broadcasting network, a digital multimedia broadcasting (DMB) network, etc., but is not limited thereto.

Figure 2:
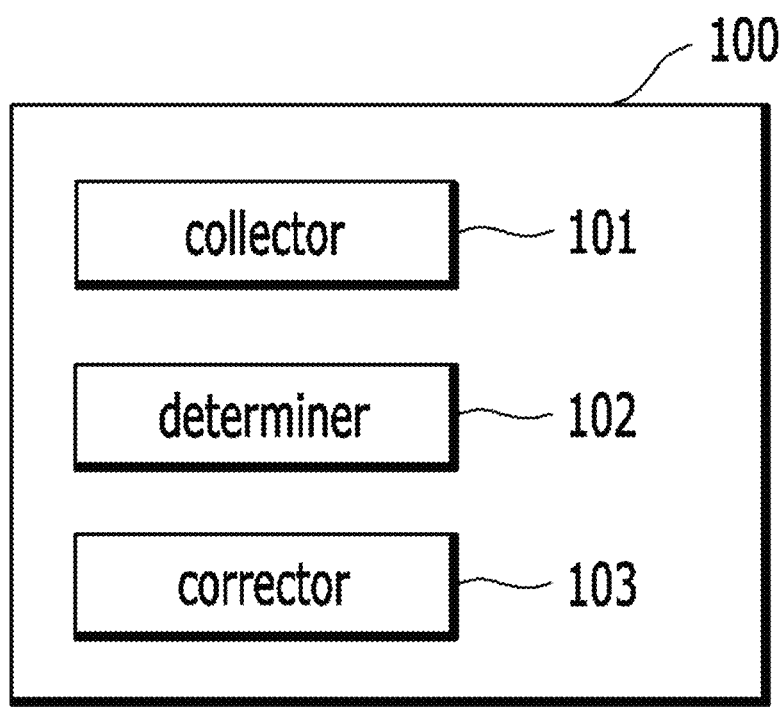
FIG. 2 is a schematic block diagram of a mobile apparatus for observing a road surface according to an exemplary embodiment of the present disclosure.

FIG. 2 is a schematic block diagram of a mobile apparatus 100 for observing a road surface according to an exemplary embodiment of the present disclosure.

Referring to FIG. 2, the apparatus 100 may include a collector 101, a determiner 102, and a corrector 103, but is not limited thereto. Further, although not illustrated in FIG. 2, the apparatus 100 may include a controller and a mover.

According to an exemplary embodiment of the present disclosure, the collector 101 may acquire road surface sensing information including image information and road surface state information corresponding to a road surface.

As an example, the apparatus 100 may acquire image information corresponding to a road surface of a target road by using a camera sensor provided in the apparatus 100. Further, the apparatus 100 may acquire road surface state information corresponding to the road surface of the target road by using a road surface state sensor 111 provided in the apparatus 100. Further, the road surface sensing information may include various information related to the road surface of the target road, and specifically, may include road surface state information, road surface temperature information, road surface color information, road surface material information, etc., but is not limited thereto.

For example, the road surface state sensor 111 may include an MARWIS sensor.

According to an exemplary embodiment of the present disclosure, the determiner 102 may determine whether there is a paint on the road surface based on the image information.

As an example, the apparatus 100 uses an artificial neural network which learns image information of a road in which there is no paint and image information of a road in which there is a predetermined specific paint, and inputs the image information acquired through the camera sensor provided in the apparatus 100 into the artificial neural network and outputs whether there is the paint in the target road to determine whether there is the paint on the road surface of the target road based on an output result.

Further, the image information may include an RGB image. The apparatus 100 may allow the artificial neural network to calculate and learn an RGB color difference based on an RGB image of the road without the paint and an RGB image of the road with a specific paint.

The above-described artificial neural network may be generated through artificial intelligence-based learning such as machine learning, deep learning, etc., but is not limited only thereto, and may adopt various neural network systems which are previously developed or developed in the future.

According to an exemplary embodiment of the present disclosure, the corrector 103 may generate final road surface state information by selectively performing correction for the road surface state information based on a result of determining whether there is the paint on the road surface.

As an example, the apparatus 100 may determine whether the acquired road surface state information needs to be corrected by considering the result of determining whether there is the paint on the road surface and weather information, and when correction is required according to the determination result, the apparatus 100 may correct the road surface state information, and then generate (output) the corrected road surface state information as the final road surface state information.

In contrast, the apparatus 100 may determine whether the acquired road surface state information needs to be corrected by considering the result of determining whether there is the paint on the road surface and weather information, and when correction is not required according to the determination result, the apparatus 100 may not correct the road surface state information, and then generate (output) the road surface state information as the final road surface state information.

Figure 3:
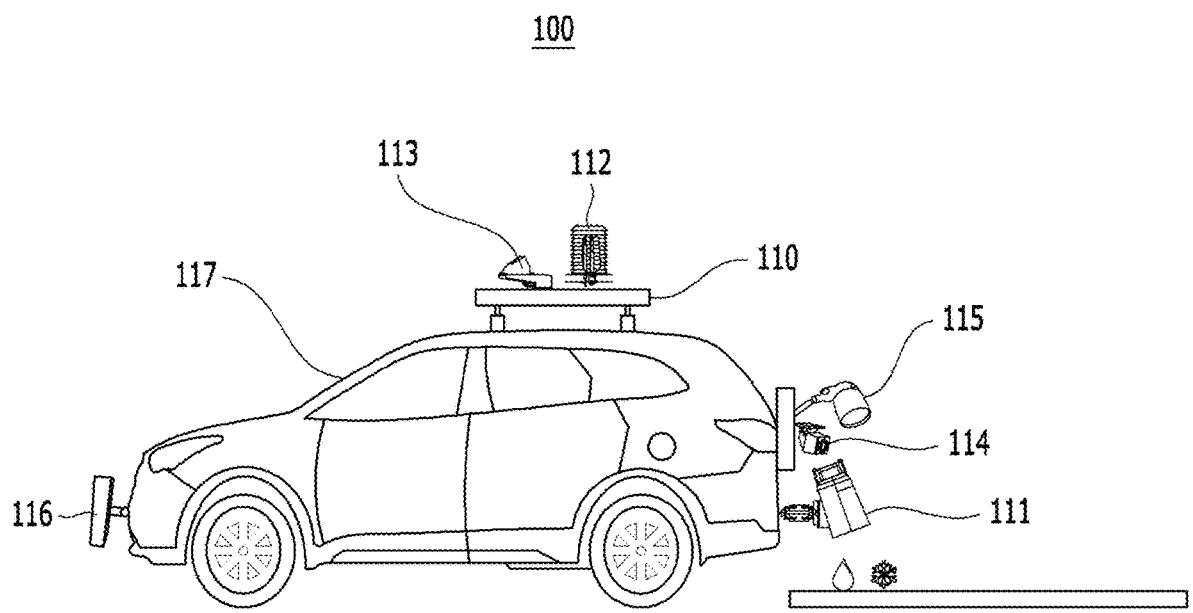
FIG. 3 is a schematic configuration diagram of the apparatus for observing a road surface according to an exemplary embodiment of the present disclosure.

FIG. 3 is a schematic configuration diagram regarding a first form of the mobile apparatus 100 for observing a road surface according to an exemplary embodiment of the present disclosure.

Referring to FIG. 3, the apparatus 100 may include a base plate 110, a precipitation detector 113, a temperature/humidity sensor 112, a road surface temperature sensor 116, a lighting member 115, a camera sensor 114, a road surface state sensor 111, a movement member 117, etc. The precipitation detector 113 provided in the apparatus 100 may determine whether there is a precipitation. Further, the temperature/humidity sensor 112 provided in the apparatus 100 measures a temperature and a humidity, and for example, may be used for determining whether the temperature satisfies a predetermined condition of 4° C. Further, the lighting member 115 provided in the apparatus 100 may be driven to be turned on when a brightness degree of natural light is less than a predetermined degree and driven to be turned off when the brightness degree of the natural light is equal to or more than the predetermined degree. Further, the camera sensor provided in the apparatus 100 may capture the road surface of the road in real time. In addition, the road surface temperature sensor 116 provided in the apparatus 100 measures a temperature of the road surface, and for example, may be used for determining whether the road surface temperature satisfies a predetermined condition of 2° C. Further, the road surface state sensor 111 provided in the apparatus 100 generates the road surface state information by sensing the state of the road surface, and at least one of a heater member, a blow member, and a wiper member may be provided in the road surface state sensor 111. The apparatus 100 may determine the state of the road surface in a situation in which the precipitation is generated and determine whether there is the paint on the road in a situation in which the precipitation is not generated.

As an example, the apparatus 100 may discriminate an accurate road surface state in the paint section of the dry road by applying an RGB color classification technique of a visible image, and at the same time, measure a weather element, thereby providing road dangerous weather information to a driver in real time. Current developed road surface sensor equipment may not secure the reliability of road state measurement data due to a limitation of an optical sensor despite a winter precipitation not being generated, such as freezing rain (sleet) and snowfall in the paint section of the road. A quality of the road surface state information may be improved through the apparatus 100, and the apparatus 100 may be designed as a mobile platform so as to enable measurement even in an actual road section in which a fixed road surface sensor is not installed. The apparatus 100 may determine a road surface state (color, material, etc.) by using a small camera capable of real-time capturing and includes the lighting member 115 to grasp the road surface state even in a visible-ray channel without a need of separately mounting an infrared sensor even at night. The apparatus 100 includes a weather sensor (the precipitation detector 113, the temperature/humidity sensor 112, the road surface temperature sensor 116, etc.) to continuously measure the road surface state information regardless of a weather situation by applying an artificial intelligence algorithm which may output an actual road surface state when the road is primarily discriminated to be the paint section in the RGB image included in the image information if a predetermined condition (e.g., the temperature of 4° C. or less, the road surface temperature of 2° C. or less, and when the precipitation is detected) is satisfied.

Figure 4:
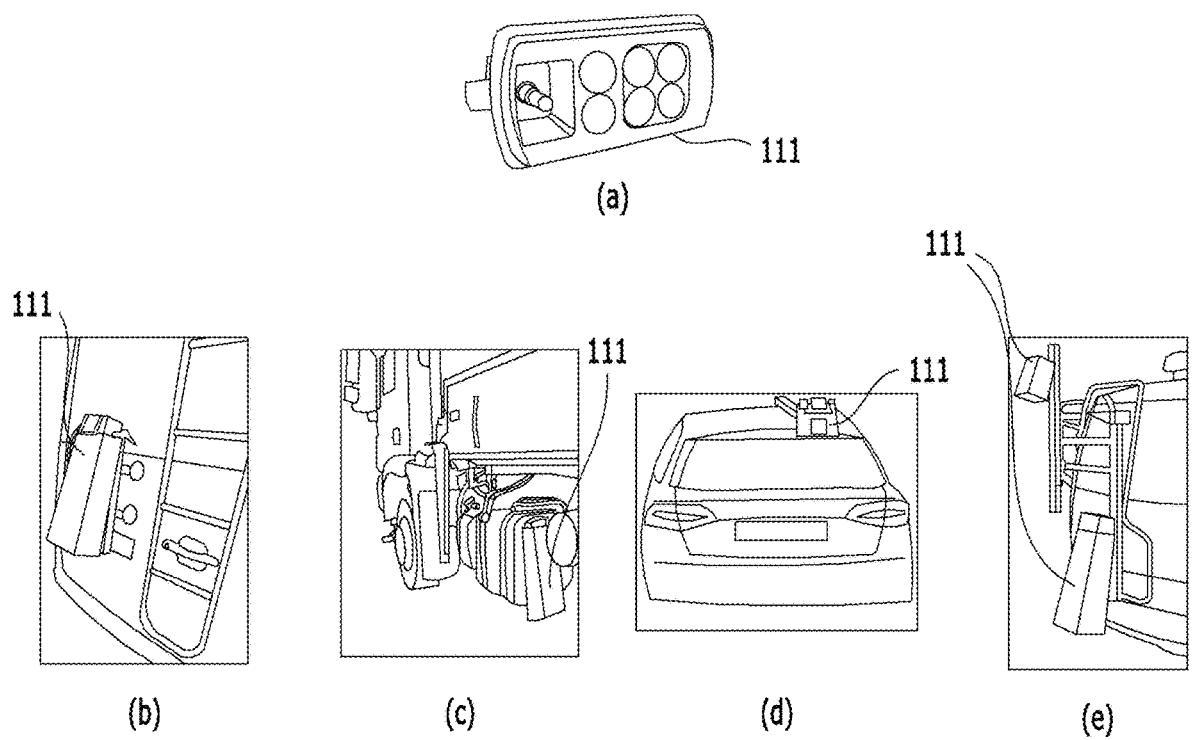
FIG. 4 is a diagram schematically illustrating an example of a road surface state sensor and road surface state sensor attached vehicle.

FIG. 4 is a diagram schematically illustrating an example of a road surface state sensor 111 and road surface state sensor attached vehicle.

Referring to FIG. 4A, the road surface state sensor 111 provided in the apparatus 100 may include an optical road surface sensor, a black ice sensor, etc., and measure both a ground surface and the temperature, and measure a road surface temperature, a dew point temperature, a relative humidity of the surface, a water membrane thickness, a friction coefficient, and freezing rate, and measure the road surface state, for example, as one of dry, damp, wet, snow/ice-covered, chemically wet, and slush, but an expression of the road surface state may be expressed as Korean, and measured items are not also limited thereto.

Referring to FIGS. 4B to 4E, one or more road surface state sensors 111 may be provided at various locations of the apparatus 100 as in FIGS. 4B to 4E.

Figure 5:
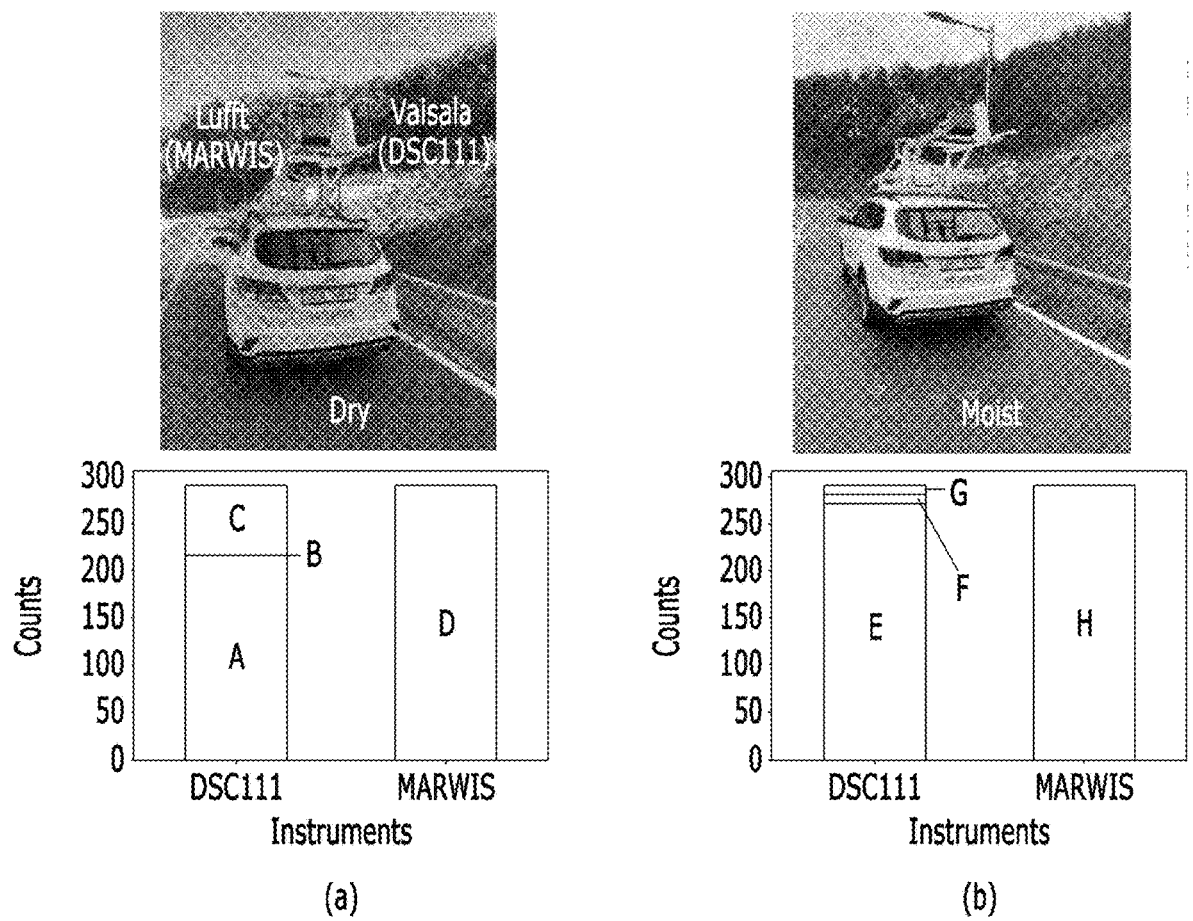
FIG. 5 is a diagram schematically illustrating data acquired when a road surface state sensor senses a dry state and a wet state of a paint section of a road on a graph in the related art.

FIG. 5 is a diagram schematically illustrating data acquired when a road surface state sensor senses a dry state and a wet state of a paint section of a road on a graph in related art.

Referring to FIGS. 5A and 5B, A and E represent Dry, B represents Ice, C represents Snow, D and F represent Moist, and G and H represent Wet, but as in respective graphs in FIGS. 5A and 5B, both two types of road surface state sensors DSC111 and MARWIS acquire error values in the paint section of the dry road, so there is a problem in reliability deterioration of the road surface state information in the dry paint section, and in the paint section of the wet road, one road surface state sensor MARWIS among a plurality of road surface state sensors has a problem in that the accuracy of the road surface state information is high, but the other road surface state sensor DSC111 acquires the error value at a high ratio, so there is a problem in that the reliability of the road surface state information also deteriorates in the wet paint section. Accordingly, the apparatus 100 may be significantly valid in solving the reliability deterioration problem of the road surface state information in the paint section.

According to an exemplary embodiment of the present disclosure, the apparatus 100 may generate the final road surface state information without correcting the road surface state information when it is determined that there is no paint on the road surface.

As an example, when the image information corresponding to the road surface of the target road acquired by using the camera sensor 114 provided in the apparatus 100 is input into an artificial neural network which learns image information of the road without the paint and image information of a road with a predetermined specific paint as a learning dataset, and it is output that there is no paint in the target road, the apparatus 100 may generate the final road surface state information in a state not of correcting the road surface state information. However, when there is a difference in common information between information extracted from the road surface state information which is not corrected and information extracted from the image information corresponding to the road surface of the target road, the road surface state information may be corrected based on the information extracted from the image information corresponding to the corresponding difference, and the corrected road surface state information may be generated as the final road surface state information.

According to an exemplary embodiment of the present disclosure, the apparatus 100 may acquire the weather information.

As an example, the weather information may include precipitation information, temperature information, humidity information, etc. The precipitation information may include precipitation generation information, precipitation particle type information, precipitation amount information, etc. The precipitation particle type information may include at least one type of a plurality of precipitation types including rain, freezing rain (sleet), snowfall, hail, etc., as the type of precipitation.

Specifically, the apparatus 100 may acquire the precipitation generation information using the precipitation detector 113 provided in the apparatus 100. Further, the apparatus 100 may acquire the temperature information and the humidity information by using the temperature/humidity sensor 112 provided in the apparatus 100. The apparatus 100 may acquire the precipitation amount information using a precipitation amount meter and a snowfall amount observing apparatus provided in the apparatus 100. The apparatus 100 may acquire the precipitation particle type information based on the image information acquired by using the camera sensor 114 provided in the apparatus 100.

According to an exemplary embodiment of the present disclosure, the road surface sensing information may include the road surface temperature information.

As an example, the apparatus 100 may acquire the road surface temperature information by using at least one of the road surface temperature sensor 116 and the road surface state sensor 111 provided in the apparatus 100. When there is a difference of a predetermined temperature or higher between first road surface temperature information acquired through the road surface temperature sensor 116 and second road surface temperature information acquired through the road surface state sensor 111, the apparatus 100 may assign a predetermined weight to the first road surface temperature information, and acquire an average value of the first road surface temperature information and the second road surface temperature information to which weights are assigned as final road surface temperature information.

According to an exemplary embodiment of the present disclosure, the apparatus 100 may determine whether the road surface temperature information and the weather information satisfy a predetermined condition when it is determined that there is the paint on the road surface.

As an example, when the image information corresponding to the road surface of the target road acquired by using the camera sensor 114 provided in the apparatus 100 is input into an artificial neural network which is trained with image information of the road without the paint and image information of a road with a predetermined specific paint as a learning dataset, and it is output that there is the paint in the target road, the apparatus 100 may determine whether the road surface temperature of the target road is equal to or less than a predetermined threshold road surface temperature based on the final road surface temperature information, the apparatus 100 may determine whether the precipitation is sensed based on the precipitation generation information, and determine whether the temperature is equal to or less than a predetermined threshold temperature based on the temperature information.

Here, the predetermined condition may include a condition in which the road surface temperature of the target road is equal to or less than the threshold road surface temperature, the precipitation is sensed, and the temperature is equal to or less than the threshold temperature. For example, the threshold road surface temperature may be 2° C. and the threshold temperature may be 4° C.

According to an exemplary embodiment of the present disclosure, the apparatus 100 may generate the final road surface state information by selectively performing correction for the road surface state information based on a result of determining whether the road surface temperature information and the weather information satisfy the predetermined condition.

As an example, when the image information corresponding to the road surface of the target road acquired by using the camera sensor 114 provided in the apparatus 100 is input into an artificial neural network which is trained with image information of the road without the paint and image information of a road with a predetermined specific paint as a learning dataset, it is output that there is the paint in the target road, it is determined that the road surface temperature of the target road is equal to or less than the threshold road surface temperature based on the final road surface temperature information, it is determined that the precipitation is sensed based on the precipitation generation information, and it is determined that the temperature is equal to or less than the threshold temperature based on the temperature information, the apparatus 100 may perform predetermined correction for the road surface state information based on the precipitation particle type information acquired based on the image information corresponding to the target road, and generate the corrected road surface state information as the final road surface state information. For example, when there is the paint on the road surface of the target road, it is determined that the road surface temperature information and the weather information satisfy the predetermined condition, and the precipitation particle type information is snow and the road surface state information is not snow, the apparatus 100 may correct the road surface state information to become snow.

As another example, when the image information corresponding to the road surface of the target road acquired by using the camera sensor 114 provided in the apparatus 100 is input into an artificial neural network which is trained with image information of the road without the paint and image information of a road with a predetermined specific paint as a learning dataset, it is output that there is the paint in the target road, it is determined that the road surface temperature of the target road is equal to or less than the threshold road surface temperature based on the final road surface temperature information, it is determined that the precipitation is sensed based on the precipitation generation information, and it is determined that the temperature is equal to or less than the threshold temperature based on the temperature information, the apparatus 100 may generate corrected image information by applying a predetermined algorithm which may output an actual road surface state to the image information corresponding to the target road. Further, when there is a difference in common information between the information extracted from the corrected image information and the information extracted from the road surface state information, the apparatus 100 may correct the road surface state information based on the information extracted from the corrected image information corresponding to the corresponding difference and generate the corrected road surface state information as the final road surface state information.

According to an exemplary embodiment of the present disclosure, the apparatus 100 may determine a dry degree based on the weather information when it is determined that the road surface temperature information and the weather information do not satisfy the predetermined condition.

As an example, as the image information corresponding to the road surface of the target road acquired by using the camera sensor 114 provided in the apparatus 100 is input into an artificial neural network which is trained with image information of the road without the paint and image information of a road with a predetermined specific paint as a learning dataset, when it is output that there is the paint in the target road, it is determined that the road surface temperature of the target road is more than the threshold road surface temperature based on the final road surface temperature information, it is determined that the precipitation is not sensed based on the precipitation generation information, or it is determined that the temperature is more than the threshold temperature based on the temperature information, the apparatus 100 may determine the dry degree based on the humidity information acquired by using the temperature/humidity sensor or the humidity sensor provided in the apparatus 100. The humidity information and the dry degree may be in inverse proportion to each other, and the apparatus 100 may calculate the dry degree based on the humidity information and a predetermined equation.

According to an exemplary embodiment of the present disclosure, the apparatus 100 may generate the final road surface state information by performing correction for the road surface state information based on the road surface sensing information when it is determined that the dry degree is equal to or more than a predetermined degree.

As an example, as the image information corresponding to the road surface of the target road acquired by using the camera sensor 114 provided in the apparatus 100 is input into an artificial neural network which is trained with image information of the road without the paint and image information of a road with a predetermined specific paint as a learning dataset, when it is output that there is the paint in the target road, it is determined that the road surface temperature of the target road is more than the threshold road surface temperature based on the final road surface temperature information, it is determined that the precipitation is not sensed based on the precipitation generation information, or it is determined that the temperature is more than the threshold temperature based on the temperature information, and it is determined that the calculated dry degree is equal to or more than a predetermined threshold dry degree based on the humidity information acquired by using the temperature/humidity sensor or the humidity sensor provided in the apparatus 100 and the predetermined equation, the apparatus 100 may calculate road state information, road surface color information, and road surface material information based on the image information corresponding to the target road acquired by using the camera sensor 114 provided in the apparatus 100, correct, when there is the difference in common information between the information extracted from the road surface sensing information including the road surface state information, the road surface color information, and the road surface material information calculated from the image information, and the road surface temperature information acquired through the road surface temperature sensor 116 and the information extracted from the road surface state information acquired through the road surface state sensor 111, the road surface state information acquired through the road surface state sensor 111 based on the information extracted from the road surface sensing information corresponding to the corresponding difference, and generate the corrected road surface state information as the final road surface state information.

According to an exemplary embodiment of the present disclosure, the apparatus 100 may generate the final road surface state information without correcting the road surface state information when it is determined that the dry degree is less than the predetermined degree.

As an example, as the image information corresponding to the road surface of the target road acquired by using the camera sensor 114 provided in the apparatus 100 is input into an artificial neural network which is trained with image information of the road without the paint and image information of a road with a predetermined specific paint as a learning dataset, when it is output that there is the paint in the target road, it is determined that the road surface temperature of the target road is more than the threshold road surface temperature based on the final road surface temperature information, it is determined that the precipitation is not sensed based on the precipitation generation information, or it is determined that the temperature is more than the threshold temperature based on the temperature information, and it is determined that the calculated dry degree is less than a predetermined threshold dry degree based on the humidity information acquired by using the temperature/humidity sensor or the humidity sensor provided in the apparatus 100 and the predetermined equation, the apparatus 100 may generate the final road surface state information without correcting the road surface state information. However, when there is a difference in common information between the information extracted from the road surface state information which is not corrected, and the information extracted from the road surface sensing information including the road surface state information, the road surface color information, and the road surface material information calculated from the image information corresponding to the road surface of the target road, and the road surface temperature information acquired through the road surface temperature sensor 116, before generating the final road surface state information, the apparatus 100 may correct the road surface state information based on the information extracted from the road surface sensing information corresponding to the corresponding difference, and generate the corrected road surface state information as the final road surface state information.

According to an exemplary embodiment of the present disclosure, the weather information may include the precipitation information.

As an example, the weather information may include precipitation information, temperature information, humidity information, etc.

According to an exemplary embodiment of the present disclosure, the weather information may include precipitation particle type information.

As an example, the precipitation information may include precipitation generation information, precipitation particle type information, precipitation amount information, etc. The precipitation particle type information may include at least one type of a plurality of precipitation types including rain, freezing rain (sleet), snowfall, hail, etc., as the type of precipitation.

According to an exemplary embodiment of the present disclosure, the apparatus 100 may generate the final road surface state information by selectively performing correction for the road surface state information based on the precipitation particle type information when it is determined that the road surface temperature information and the weather information satisfy the predetermined condition.

As described above, as an example, when the image information corresponding to the road surface of the target road acquired by using the camera sensor 114 provided in the apparatus 100 is input into an artificial neural network which is trained with image information of the road without the paint and image information of a road with a predetermined specific paint as a learning dataset, it is output that there is the paint in the target road, it is determined that the road surface temperature of the target road is equal to or less than the threshold road surface temperature based on the final road surface temperature information, it is determined that the precipitation is sensed based on the precipitation generation information, and it is determined that the temperature is equal to or less than the threshold temperature based on the temperature information, the apparatus 100 may perform predetermined correction for the road surface state information based on the precipitation particle type information acquired based on the image information corresponding to the target road, and generate the corrected road surface state information as the final road surface state information. For example, when there is the paint on the road surface of the target road, it is determined that the road surface temperature information and the weather information satisfy the predetermined condition, and the precipitation particle type information is snow and the road surface state information is not snow, the apparatus 100 may correct the road surface state information to become snow.

As another example, when the image information corresponding to the road surface of the target road acquired by using the camera sensor 114 provided in the apparatus 100 is input into an artificial neural network which is trained with image information of the road without the paint and image information of a road with a predetermined specific paint as a learning dataset, it is output that there is the paint in the target road, it is determined that the road surface temperature of the target road is equal to or less than the threshold road surface temperature based on the final road surface temperature information, it is determined that the precipitation is sensed based on the precipitation generation information, and it is determined that the temperature is equal to or less than the threshold temperature based on the temperature information, the apparatus 100 may generate corrected image information by applying a predetermined algorithm which may output an actual road surface state to the image information corresponding to the target road. Further, when there is a difference in common information between the information extracted from the corrected image information and the information extracted from the road surface state information, the apparatus 100 may correct the road surface state information based on the information extracted from the corrected image information corresponding to the corresponding difference and generate the corrected road surface state information as the final road surface state information.

According to an exemplary embodiment of the present disclosure, the weather information may include temperature information and precipitation information.

As an example, the weather information may include precipitation information, temperature information, humidity information, etc.

According to an exemplary embodiment of the present disclosure, the predetermined conditions may include temperature information of a predetermined threshold temperature or less, precipitation information of a predetermined threshold precipitation amount or more, and road surface temperature information of a predetermined threshold road surface temperature or less.

As an example, the predetermined condition may include a condition in which the road surface temperature of the target road is equal to or less than the threshold road surface temperature, the precipitation is sensed, and the temperature is equal to or less than the threshold temperature. For example, the threshold road surface temperature may be 2° C. and the threshold temperature may be 4° C.

According to an exemplary embodiment of the present disclosure, the apparatus 100 may include a road surface state sensor 111 and a lighting member 115.

As an example, the apparatus 100 may include at least one road surface state sensor 111 in the base plate 110 or the movement member 117 at a location and an angle to sense the road surface of the target road. Further, the apparatus 100 may include the lighting member 115 to irradiate a light source to a location where a capturing direction of the camera sensor 114 provided in the apparatus 100 and capturing the road surface of the target road, and the road surface of the target road meet.

According to an exemplary embodiment of the present disclosure, the road surface state sensor 111 may include at least one of a heater member, a blow member, and a wiper member.

As an example, the road surface state sensor 111 provided in the apparatus 100 may include at least one member of a heater member heating the road surface state sensor 111, a blow member applying wind pressure toward the road surface state sensor 111, and a wiper member moving in contact with the surface of the road surface state sensor 111. Further, the road surface state sensor 111 provided in the apparatus 100 may include a temperature/humidity sensor sensing a temperature and a humidity inside and outside the road surface state sensor 111, and a camera sensor capturing the road surface state sensor 111.

According to an exemplary embodiment of the present disclosure, the apparatus 100 may acquire road surface state information by using the road surface state sensor 111.

As an example, the apparatus 100 may acquire road surface state information for a road surface of a road in which there is no paint or a road surface of a road in which there is the paint, and a dry degree is less than a threshold dry degree by using the road surface state sensor 111. When intending to acquire road surface state information of a road in which the dry degree is equal to or more than the threshold dry degree, the apparatus 100 may acquire the road surface state information by using the road surface state sensor 111 and acquire road surface state information corrected based on image information targeting the road surface as final road surface state information.

According to an exemplary embodiment of the present disclosure, the apparatus 100 may selectively drive at least one of the heater member, the blow member, and the wiper member based on the weather information.

As an example, when a temperature is less than a predetermined temperature based on the weather information, a humidity is equal to or more than a predetermined humidity, a precipitation is sensed, internal and external temperatures of the road surface state sensor 111 are less than a predetermined temperature, internal and external humidities of the road surface state sensor 111 are equal to or more than a predetermined humidity, and it is captured that the road surface state sensor 111 is in contact with snow or rain, the apparatus 100 may drive the heater member to heat the road surface state sensor 111 provided in the apparatus 100, drive the blow member to apply the wind pressure to the road surface state sensor 111 provided in the apparatus 100, and drive the wiper member to move in contact with the surface of the road surface state sensor 111 provided in the apparatus 100.

According to an exemplary embodiment of the present disclosure, the apparatus 100 may selectively drive the lighting member 115 based on the image information.

As an example, the apparatus 100 may set a first minimum brightness degree for identifying whether there is the paint in the target road included in the image information and set a second minimum brightness degree for identifying whether there is a matter of a predetermined volume or more on the road surface of the paint section of the target road included in the image information. In a situation before identifying whether there is the paint on the road surface of the target road for acquiring the road surface state information, when a brightness degree of the image information is less than the first minimum brightness degree, the apparatus 100 may drive the lighting member 115 so that the brightness degree of the image information becomes equal to or more than the first minimum brightness degree. Further, in a situation before identifying whether there is the matter in the paint section of the target road, when the brightness degree of the image information is less than the second minimum brightness degree, the apparatus 100 may drive the lighting member 115 so that the brightness degree of the image information becomes equal to or more than the second minimum brightness degree. The first minimum brightness degree may be a brightness degree which is darker than the second minimum brightness degree.

According to an exemplary embodiment of the present disclosure, the apparatus 100 may include a base plate 110 with a movement member 117.

As an example, at least one of the temperature/humidity sensor, the road surface state sensor 111, the road surface temperature sensor 116, the lighting member 115, and the camera sensor 114 may be provided in the base plate 110 with the movement member 117 or the movement member 117.

According to an exemplary embodiment of the present disclosure, the apparatus 100 may move a location of the base plate 110 from a first location to a second location by using the movement member 117.

As an example, the apparatus 100 may move the location of the base plate 110 from the first location to the second location by using the movement member 117 at less than a first maximum speed for identifying whether there is the paint on the road surface of the target road based on the image information in the situation before identifying whether there is the paint on the road surface of the target road for acquiring the road surface state information. Further, the apparatus 100 may move the location of the base plate 110 from the first location to the second location by using the movement member 117 at less than a second maximum speed for identifying whether there is the matter of the predetermined volume or more on the road surface of the paint section of the target road based on the image information in the situation before identifying whether there is the matter in the paint section of the target road.

According to an exemplary embodiment of the present disclosure, the second location may be location information corresponding to the road surface in which there is the paint.

As an example, the second location may be location information corresponding to the paint section of the road for which the apparatus 100 does not acquire the road surface state information. The first location may be location information of a point where the apparatus 100 is positioned. The apparatus 100 may receive a second location closest to the first location where the apparatus 100 is positioned from the user terminal 200 or the external server 300.

Hereinafter, an operation flow of the present disclosure will be described in brief based on the contents described above in detail.

Figure 6:
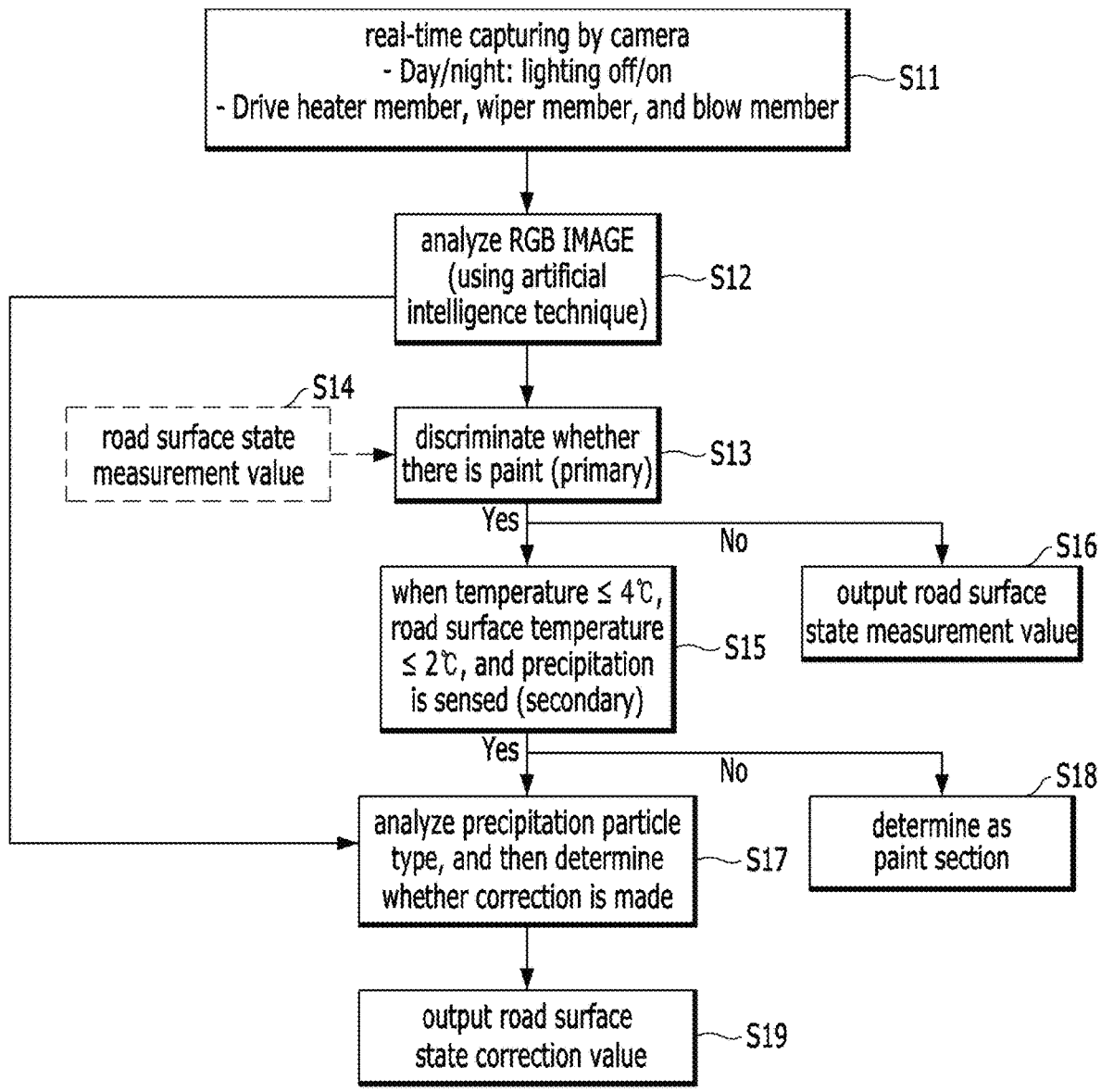
FIG. 6 is an operation flowchart for a first control method of a mobile apparatus for observing a road surface according to an exemplary embodiment of the present disclosure.

FIG. 6 is an operation flowchart for a first control method of a mobile apparatus 100 for observing a road surface according to an exemplary embodiment of the present disclosure.

Figure 7:
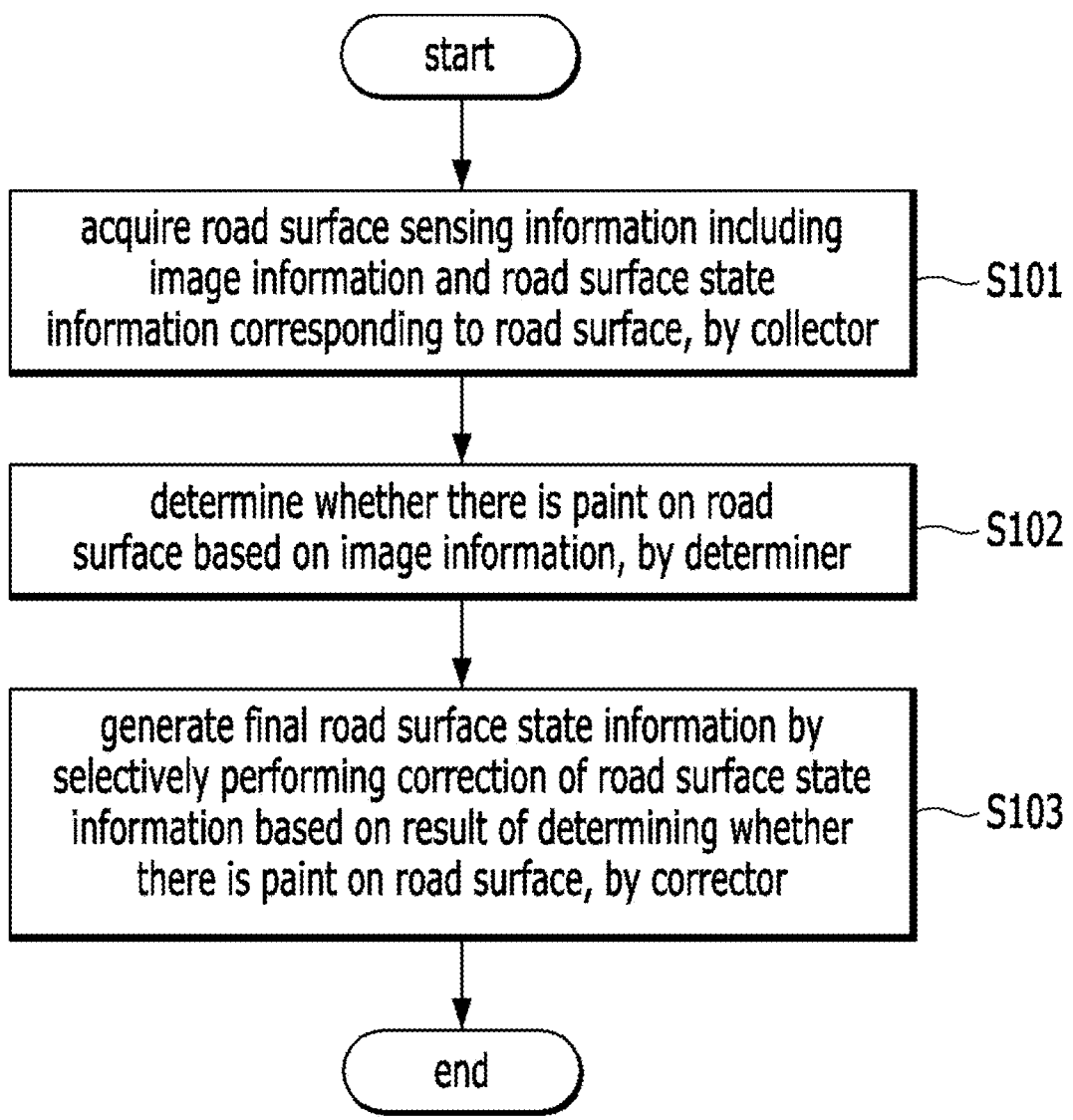
FIG. 7 is an operation flowchart for a second control method of the mobile apparatus for observing a road surface according to an exemplary embodiment of the present disclosure.

FIG. 7 is an operation flowchart for a second control method of the mobile apparatus 100 for observing a road surface according to an exemplary embodiment of the present disclosure.

The control method of the mobile apparatus 100 for observing a road surface illustrated in FIGS. 6 and 7 may be performed by the mobile apparatus 100 for observing a road surface described above. Accordingly, hereinafter, in spite of contents omitted below, the contents described regarding the mobile apparatus 100 for observing a road surface may also be similarly applied to a description of the control method of the mobile apparatus 100 for observing a road surface.

Referring to FIG. 6, the control method of the mobile apparatus 100 for observing a road surface may include steps S11 to S19.

In step S11, the apparatus 100 may capture the target road in real time by using the camera sensor 114 and drive the lighting member 115 at night when a brightness degree is less than a predetermined degree without driving the lighting member 115 during the day when the brightness degree is equal to or more than the predetermined degree. The camera sensor 114 provided in the apparatus 100 may include the heater member, the wiper member, and the blow member, and drive the heater member, the wiper member, and the blow member based on the weather information, similarly to the above-described road surface state sensor 111.

In step S12, the apparatus 100 may conduct steps to be described below by analyzing an RGB image included in image information by an artificial intelligence technique.

In step S13, the apparatus 100 may discriminate whether there is a paint on a road surface of a target road based on the image information.

In step S14, the apparatus 100 may consider a road surface state measurement value included in road surface state information in conducting the steps to be described below.

In step S15, the apparatus 100 may determine whether the weather information and the road surface temperature information satisfy the predetermined condition described above when there is the paint on the road surface of the target road.

In step S16, the apparatus 100 may output the road surface state measurement value of step S13 as final road surface state information when there is no paint on the road surface of the target road.

In step S17, when the weather information and the road surface temperature information satisfy the predetermined condition, the apparatus 100 may analyze the precipitation particle type through analysis of the RGB image, and then determine whether to correct the road surface state measurement value.

In step S18, when the weather information and the road surface temperature information do not satisfy the predetermined condition, the apparatus 100 may determine the target road as the paint section. As a result, the apparatus 100 may selectively correct the road surface state measurement value by considering the image information and the weather information.

In step S19, the apparatus 100 may output a road surface state correction value based on the determination in step S17.

Referring to FIG. 7, the control method of the mobile apparatus 100 for observing a road surface may include steps S101 to S103.

In step S101, the collector 101 may acquire road surface sensing information including image information and road surface state information corresponding to a road surface.

In step S102, the determiner 102 may determine whether there is the paint on the road surface based on the image information.

In step S103, the corrector 103 may generate final road surface state information by selectively performing correction for the road surface state information based on a result of determining whether there is the paint on the road surface.

In the above description, steps S11 to S19, and steps S101 to S103 may further be divided into additional steps or combined as fewer steps according to an implementation example of the present disclosure. Further, some steps may also be omitted as necessary, and an order between the steps may be changed.

The control method of the mobile apparatus 100 for observing a road surface according to an exemplary embodiment of the present disclosure is implemented in a form of a program command which may be performed through various computer means and may be recorded in the computer readable medium. The computer readable medium may include a program command, a data file, a data structure, etc., singly, or combinationally. The program command recorded in the medium may be specially designed and configured for the present disclosure or may be publicly known to and used by those skilled in the computer software field. An example of the computer readable recording medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. An example of the program command includes a high-level language code executable by a computer by using an interpreter and the like, as well as a machine language code created by a compiler. The above-described hardware device may be configured to be operated with one or more software modules in order to perform the operation of the present disclosure and vice versa.

Further, the control method of the mobile apparatus 100 for observing a road surface may also be implemented in a form of a computer program or an application executed by the computer, which is stored in the recording medium.

The aforementioned description of the present disclosure is used for exemplification, and it can be understood by those skilled in the art that the present disclosure can be easily modified in other detailed forms without changing the technical spirit or requisite features of the present disclosure. Therefore, it should be appreciated that the aforementioned exemplary embodiments are illustrative in all aspects and are not restricted. For example, respective constituent elements described as single types can be distributed and implemented, and similarly, constituent elements described to be distributed can also be implemented in a coupled form.

The scope of the present disclosure is represented by claims to be described below rather than the detailed description, and it is to be interpreted that the meaning and scope of the claims and all the changes or modified forms derived from the equivalents thereof come within the scope of the present disclosure.

What is claimed is:

1. A mobile apparatus for observing a road surface, comprising:
    a collector acquiring road surface sensing information including image information and road surface state information corresponding to a road surface;
    a determiner determining whether there is a paint on the road surface based on the image information; and
    a corrector generating final road surface state information by selectively performing correction of the road surface state information based on a result of determining whether there is the paint on the road surface,
    wherein the collector further acquires weather information,
    wherein the road surface sensing information further includes road surface temperature information,
    wherein the determiner determines whether the road surface temperature information and the weather information satisfy a predetermined condition when it is determined that the paint is present on the road surface.

2. The mobile apparatus for observing a road surface of claim 1, wherein the corrector generates the final road surface state information without performing the correction of the road surface state information when it is determined that the paint is not present on the road surface.

3. The mobile apparatus for observing a road surface of claim 1, wherein the corrector generates the final road surface state information by selectively performing the correction of the road surface state information based on a result of determining whether the road surface temperature information and the weather information satisfy the predetermined condition.

4. The mobile apparatus for observing a road surface of claim 3, wherein the determiner determines a dry degree based on the weather information when it is determined that the road surface temperature information and the weather information do not satisfy the predetermined condition.

5. The mobile apparatus for observing a road surface of claim 4, wherein the corrector generates the final road surface state information by performing the correction of the road surface state information based on the road surface sensing information when it is determined that the dry degree is equal to or more than a predetermined degree.

6. The mobile apparatus for observing a road surface of claim 4, wherein the corrector generates the final road surface state information without performing the correction of the road surface state information when it is determined that the dry degree is less than a predetermined degree.

7. The mobile apparatus for observing a road surface of claim 3, wherein the weather information includes precipitation information, and
    the precipitation information includes precipitation particle type information.

8. The mobile apparatus for observing a road surface of claim 7, wherein the corrector generates the final road surface state information by selectively performing the correction of the road surface state information based on the precipitation particle type information when it is determined that the road surface temperature information and the weather information satisfy the predetermined condition.

9. The mobile apparatus for observing a road surface of claim 3, wherein the weather information includes temperature information and precipitation information, and
    the predetermined condition includes temperature information of a predetermined threshold temperature or less, precipitation information of a predetermined threshold precipitation amount or more, and road surface temperature information of a predetermined threshold road surface temperature or less.

10. The mobile apparatus for observing a road surface of claim 1, wherein the mobile apparatus for observing the road surface includes a road surface state sensor and a lighting member,
    the road surface state sensor includes at least one of a heater member, a blow member, and a wiper member,
    the collector acquires the road surface state information by using the road surface state sensor, and
    the mobile apparatus for observing the road surface further includes a controller selectively driving at least one of the heater member, the blow member, and the wiper member based on the weather information, and selectively driving the lighting member based on the image information.

11. The mobile apparatus for observing a road surface of claim 1, wherein the mobile apparatus for observing a road surface includes a base plate with a movement member,
    the mobile apparatus for observing the road surface further includes a mover moving a location of the base plate from a first location to a second location by using the movement member, and
    the second location is location information corresponding to the road surface in which there is the paint.

12. A method for controlling a mobile apparatus for observing a road surface, comprising:
    acquiring, by a collector, road surface sensing information including image information and road surface state information corresponding to a road surface;
    determining, by a determiner, whether there is a paint on the road surface based on the image information; and
    generating, by a corrector, final road surface state information by selectively performing correction of the road surface state information based on a result of determining whether there is the paint on the road surface,
    wherein the acquiring road surface sensing information includes further acquiring weather information,
    wherein the road surface sensing information further includes road surface temperature information,
    wherein the determining whether there is a paint on the road surface includes determining whether the road surface temperature information and the weather information satisfy a predetermined condition when it is determined that the paint is present on the road surface.

13. A computer readable non-transitory recording medium having a program for executing the method of claim 12 recorded on a computer.

\* \* \* \* \*